2,941,936
Patented June 21, 1960

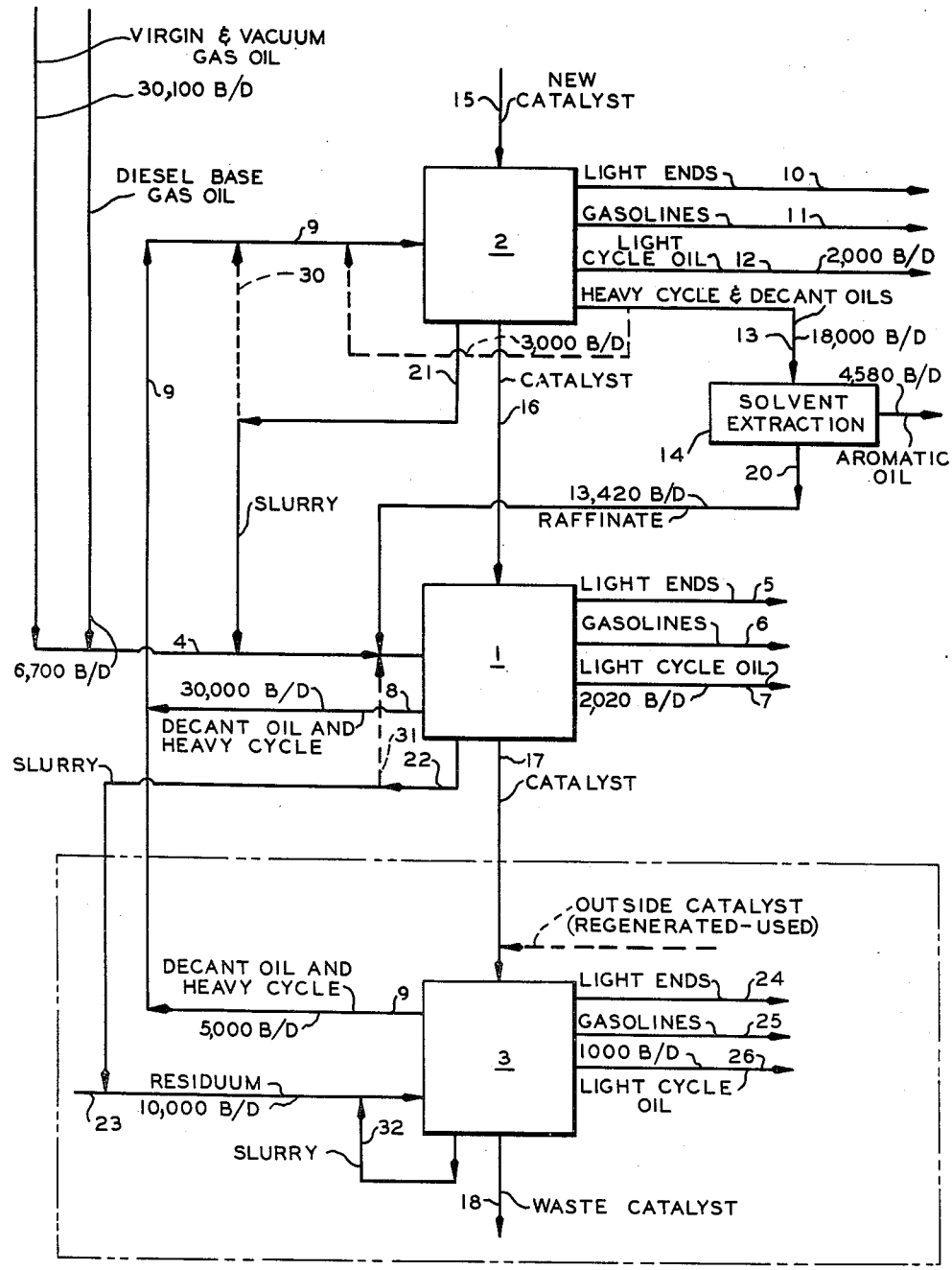

2,941,936
COMBINATION CATALYTIC CRACKING PROCESS PRODUCING AROMATICS CONCENTRATE

Kenneth A. Harper, Bartlesville, Okla., assignor to Phillips Petroleum Company, a corporation of Delaware Filed Sept. 21, 1956, Ser. No. 611,110

1 Claim. (Cl. 208—74)

This invention relates to a catalytic cracking operation or process. In one of its aspects, this invention relates to a combination catalytic cracking process comprising at least two cracking zones in which a substantially unconverted oil is converted in the presence of a used catalyst to produce an aromatics-containing stream and the aromatics-containing stream is further converted to increase the aromatics content thereof in presence of a freshly prepared or regenerated catalyst, thus producing said used catalyst. In another aspect of the invention, catalyst employed to crack the substantially unconverted oil is further used in a third zone to crack a residual stock or oil, thus producing additional aromatics-containing oil which can be converted in the presence of the freshly prepared or regenerated catalyst. In a further aspect of the invention, the oil or oils cracked in the presence of the freshly prepared or regenerated catalyst containing the highest concentration of aromatics is subjected to solvent extraction to obtain an aromatics concentrate as a product of the process while a raffinate thus obtained is converted in the presence of said used catalyst to furnish, at least in part, the aromatics-containing oil to be cracked in the presence of the freshly prepared or regenerated catalyst.

The cracking of oils to produce aromatics is well known. Also, the specific conditions for converting virgin or cracked oils of various kinds are fairly well established in the art. There are known also certain combinations of operations, each of which is designed to produce certain advantages of operation, yield, or product quality or a combination of one or more of these and related objects.

In the cracking of oils in the presence of catalysts, there is obtained, especially when said oils have not been placed into the presence of a catalyst, metals contamination of the said catalyst. These metals contaminants are objectionable in the sense that they reduce the yield and/or quality of the final products which are obtained. One manner in which the said products are reduced in quality and/or yield is through the formation of coke upon the catalyst due to the modification of its activity for the production of desirable products such as gasolines, light oils, etc. Coke formation is encouraged by such contaminants. Also, such a catalyst which has been contaminated is not best suited for the production of aromatics from cycle oils.

A process which is particularly adapted for the catalytic cracking of different types of hydrocarbons in separate catalytic cracking units has now been found in which virgin gas oils which can include vacuum gas oils as well as raffinates obtained by solvent extraction of cycle oils obtained from catalytic cracking are charged to a first reaction zone, the cycle and any decant oils so produced are charged to a second reaction zone. The cycle oils are substantially metals-free and, therefore, in said second reaction zone are contacted with the freshest catalyst for increasing the aromatics in said once-cracked oil, and the catalyst from said second reaction zone is passed to said first reaction zone wherein it serves to accomplish the reaction therein and the elimination from the cycle oil produced therein of the metals contaminants. Where a catalyst slurry stream or decant oil is obtained, it is passed from the second reaction zone to the first reaction zone. It will be understood by those skilled in the art in possession of this disclosure that the invention is not to be limited to FCC or TCC types of operations in connection with which it is described for disclosure purposes.

Further, it is possible, according to the invention, to pass the twice-used catalyst to a third reaction zone wherein a residuum oil which contains the highest proportion of metals contaminants is catalytically cracked producing cycle oils and in some cases a decant oil which can be charged and are charged to the second reaction zone, preferably together with the above-mentioned cycle oil obtained from cracking the virgin or unconverted oil.

Thus, it will be noted that the cycle oils which usually are of the heavy-type are further cracked to increase their aromatics content in the absence of additional virgin or substantially unconverted oil, thus obtaining a twice-cracked aromatics-containing oil which is termed an aromatics concentrate which is then subjected to solvent extraction in a zone which need not have the capacity which it would otherwise have to have had the original cycle oil been extracted prior to increasing the aromatics content thereof in the second cracking zone.

Thus, with no recycling of the cycle oils to either the first or second cracking zones, the quality of the charge (paraffinicity) to these zones is greatly improved over conventional operations. Thus, milder conditions can be employed in the virgin distillate catalytic cracking zone to produce more of desired products with formation of less gases and coke.

It is an object of this invention to catalytically crack hydrocarbon oil. It is another object of this invention to provide a process wherein oils are catalytically cracked to produce an aromatics concentrate from which there can be obtained by solvent extraction an aromatics-containing product. It is another object of this invention to eliminate metals contamination of catalyst in the cracking of a refractory or aromatics-containing oil to increase the aromatics content thereof. It is a further object of this invention to provide a process for the catalytic cracking of oils wherein use is made of a freshly prepared or regenerated catalyst in a manner such that the most refractory oil of the system is cracked with the freshly prepared or regenerated catalyst and that the less refractory or substantially unconverted oil or oils are cracked with said catalyst after it has been used in a manner and under conditions such as to remove metals containing contaminants from the oils cracked therewith. Other aspects, objects and the advantages of the invention are apparent from a study of this disclosure, the drawing and the appended claims.

According to this invention, there is provided a hydrocarbon cracking operation resulting in the recovery of an aromatics-containing concentrate which comprises cracking a substantially virgin gas oil in a first zone in the presence of a catalyst, thus obtaining a first products stream including usual fractions, removing from said first products stream a first cycle oil products stream containing some aromatics, cracking said cycle oil in the absence of virgin gas oil in the presence of a catalyst in a second zone under conditions increasing substantially the aromatics in said cycle oil thus producing a second cycle oil products stream, solvent-extracting said second cycle oil products stream so as to obtain substantially therefrom the aromatics therein contained as a product of the process, and returning a raffinate thus obtained to said first zone.

Further, according to said invention, there is provided a cracking operation, as described, wherein the cracking catalyst of highest activity is first used in said second zone and is then used in said first zone, thus having the highest activity of the catalyst to crack the most aromatic or refractory oil and avoiding the presence of metals contaminants in said catalyst in said second zone. While gas oil has been mentioned above, it is clear that a virgin oil which is cracked to produce the aromatics containing cycle oil or products stream need not be specifically a gas oil but can be a topped crude or other suitable fraction from which, by cracking in the presence of a catalyst, a cycle oil containing aromatics or suitable for cracking to aromatics is obtained.

It will be obvious to one skilled in the art in possession of this disclosure that various equivalent oils and steps of operation can be substituted within the scope of the appended claims without departing therefrom.

The drawing is a diagrammatic or schematic flow plan in which there are shown the principal streams in an embodiment according to the invention in which three catalytic cracking zones are employed. Only two of the said zones are required to effectuate the invention in its broadest form.

Referring now to the drawing, a feed composed of 30,100 barrels per day of a mixture of virgin and vacuum gas oils, 6,700 barrels per day of diesel base oil is passed by way of pipe 4 into cracking zone 1 wherein it is cracked under catalytic conversion conditions to produce a cracked products stream containing gases, light ends, gasoline, and approximately 2,020 barrels per day of light cycle oil. Also obtained from zone 1 is a decant oil and heavy cycle oil stream amounting to 30,000 barrels per day. The several streams described are removed respectively by way of pipes 5, 6, 7 and 8. The stream in pipe 8 is passed to pipe 9 and, by way of pipe 9, to catalytic cracking zone 2 wherein it is converted in the presence of fresh catalyst to produce gases, light ends, gasolines, light cycle oil and approximately 21,000 barrels per day of heavy cycle and decant oil which are removed by way of pipes 10, 11, 12 and 13, respectively.

Catalyst is introduced to the system by way of pipe 15, and is passed through zone 2 and by way of pipe 16 to zone 1. Later, as will be more fully described, catalyst from zone 1 is passed by way of pipe 17 to zone 3 and from zone 3 by way of pipe 18 to waste catalyst disposal or regeneration, as desired.

In the operation being described, each of the cracking zones 1, 2, and 3, is composed of a cracking reactor having fluidized flow of finely divided catalyst, a regenerator employing also the fluid solids technique, along with fractionating facilities which system is well known in the art as an FCC unit. The catalyst can be of any desired type of cracking catalyst and in the embodiment being described is a silica-alumina cracking catalyst. If desired, a small portion of the oil in pipe 13 can be recycled to zone 2. However, this procedure is not now preferred and the oil in the embodiment being described is passed by way of pipe 13 to solvent-extraction zone 14 wherein approximately 4,580 barrels per day of aromatic oil is removed. The operation of the solvent-extraction zone can be conventionally accomplished. Thus, sulfur dioxide can be employed to extract the aromatics from the oil resulting in a raffinate which is passed by way of conduit 20 in an amount approximating 13,420 barrels per day to zone 1. Some of the oil from zone 2 is passed together with catalyst by way of pipe 21 into pipe 4 and passes in admixture with the feed oil into zone 1. Also, some of the oil from zone 1, together with catalyst slurry, passes by way of pipe 22 into admixture with a residual oil introduced in the amount approximating 10,000 barrels per day in pipe 23, the mixture being discharged into zone 3 wherein it is catalytically converted to produce approximately 5,000 barrels per day of heavy cycle and decant oil which is passed by way of pipe 9 to zone 2 for cracking therein, as earlier described. In zone 3, there are also recovered gases, light ends, gasolines and light cycle oil which are obtained by way of pipes 24, 25 and 26, respectively. The amount of light cycle oil obtained from zone 2 by way of pipe 12 and from zone 3 by way of pipe 26, are respectively 2,000 barrels per day and 1,000 barrels per day. These oils can be blended as desired and used as such or at least a portion thereof can be employed to dilute the oils passing to zones 1 and 3 or to one of the said zones, as desired. Optional provision is made for recirculating some catalyst slurry to zones 2, 1 and 3 respectively, through pipes 30, 31 and 32, respectively.

The following tabulation includes operating conditions for each of zones 1, 2 and 3 which are set forth by way of exemplification only.

TABULATION

|  | Zone 1 | Zone 2 | Zone 3 |
|---|---|---|---|
| Reactor: |  |  |  |
| Pressure, p.s.i.g | 10 | 10 | 10 |
| Temperature, °F | 900 | 880 | 925 |
| Space Velocity [1] | 5 | 2 | 10 |
| Catalyst/Oil Weight Ratio | 6.0 | 5.5 | 6.75 |
| Conversion, Vol. percent | 49.5 | 43.0 | 40.0 |
| Regenerator: |  |  |  |
| Pressure, p.s.i.g | 7 | 7 | 7 |
| Temperature, °F | 1,125 | 1,125 | 1,125 |
| Catalyst (silica-alumina): |  |  |  |
| Particle size, microns | 10-150 | 10-150 | 10-150 |
| Metals content, p.p.m.[2] | 400 | trace | 5,000 |

[1] Weight of oil per hour per weight of catalyst in the reaction zone.
[2] Measured as oxides of nickel, iron, and vanadium.

Whenever a moving bed (TCC) cracking operation is conducted, the details of the unit will be different as is known and obvious to one versed in the moving bed catalysis art of converting oils. However, the basic flow plans for oil and/or catalyst are essentially the same as described.

Reasonable modification and variation are possible within the scope of the foregoing disclosure, drawing and the appended claim to the invention, the essence of which is that a combination of steps for the conversion of hydrocarbon oils has been set forth and described wherein an aromatics concentrate is obtained by cracking a cycle oil, obtained by cracking a substantially unconverted oil in the presence of a used catalyst, in the presence of a fresh or regenerated catalyst, which catalyst then becomes the said used catalyst, as described, and wherein in one embodiment, cycle oil containing aromatics obtained from said cracking of said cycle oil in the presence of the freshly prepared or regenerated catalyst is extracted to remove aromatics therefrom resulting in a raffinate which is subjected to conversion together with said substantially unconverted oil, as described, and wherein in another embodiment, catalyst used to crack the unconverted oil and/or raffinate is used to crack a residual oil to produce additional aromatics containing cycle oil which is cracked in the presence of the freshly prepared or regenerated catalyst, as described, resulting in the production of an aromatics concentrate under conditions eliminating metals contaminants which are in the substantially unconverted oil or in the residual oil, both of which are converted in the process.

I claim:

A hydrocarbon cracking operation resulting in the recovery of an aromatics-containing concentrate from a cracking operation in which aromatization is accomplished, avoiding cracking of a refractory stock with a catalyst containing metals contaminants which comprises cracking a substantially virgin gas oil containing metals contaminants in a first zone in the presence of a catalyst of a relatively low activity which has been used to crack a cycle oil as later herein defined, thus obtaining a first product stream including usual fractions and a catalyst having thereon metals contaminants removed by said catalyst from said virgin gas oil, removing from said first product stream a first cycle oil product stream containing some aromatics and having a substantially reduced metals contaminants content, directly cracking said cycle oil as obtained, and without changing its aromatics content, in the absence of virgin gas oil containing metals contaminants, in the presence of a catalyst having a relatively high activity, in a second zone under conditions increasing substantially the aromatics in said cycle oil, thereby to produce a second cycle oil product stream, solvent-extracting said second cycle oil product stream so as to obtain substantially therefrom the aromatics therein contained as a product of the process, and returning a raffinate thus obtained to said first zone.

References Cited in the file of this patent

UNITED STATES PATENTS

| | | |
|---|---|---|
| 2,374,102 | Jahn et al. | Apr. 17, 1945 |
| 2,377,078 | Gerhold | May 29, 1945 |
| 2,387,088 | Oblad et al. | Oct. 16, 1945 |
| 2,390,556 | Ruthruff | Dec. 11, 1945 |
| 2,406,547 | Kuhl et al. | Aug. 27, 1946 |
| 2,431,243 | Greensfelder et al. | Nov. 18, 1947 |
| 2,608,470 | Helmers et al. | Aug. 26, 1952 |
| 2,702,782 | Little | Feb. 22, 1955 |
| 2,734,021 | Martin et al. | Feb. 7, 1956 |
| 2,737,474 | Kimberlin, et al. | Mar. 6, 1956 |
| 2,765,264 | Pasik | Oct. 2, 1956 |
| 2,766,184 | Blanding et al. | Oct. 9, 1956 |
| 2,768,126 | Haensel | Oct. 23, 1956 |
| 2,809,922 | Berg et al. | Oct. 15, 1957 |